United States Patent [19]
Laman

[11] 3,834,538
[45] Sept. 10, 1974

[54] FLOATING ANTI-POLLUTION APPARATUS
[75] Inventor: Joseph Richard Laman, Akron, Ohio
[73] Assignee: The Firestone Tire & Rubber Company, Akron, Ohio
[22] Filed: Oct. 10, 1972
[21] Appl. No.: 296,411

[52] U.S. Cl............ 210/154, 210/DIG. 21, 210/170, 210/242
[51] Int. Cl...................... B01d 33/00, E02b 15/04
[58] Field of Search ............. 210/83, 242, 153, 154, 210/160, 170, DIG. 21, 523, 526

[56] References Cited
UNITED STATES PATENTS
| 42,073 | 3/1864 | Cannon | 210/242 |
| 2,869,728 | 1/1959 | Wallen | 210/526 |
| 3,403,098 | 9/1968 | Hirs | 210/DIG. 21 |
| 3,563,380 | 2/1971 | Thomas | 210/242 |
| 3,613,891 | 10/1971 | Clouner | 210/242 |
| 3,643,804 | 2/1972 | Sharpton | 210/DIG. 21 |
| 3,700,593 | 10/1972 | Bezemer et al. | 210/DIG. 21 |

Primary Examiner—Theodore A. Granger

[57] ABSTRACT

Floating apparatus to be anchored across a polluted stream to skim the water and collect the debris. The apparatus includes a floating boom anchored within abutments by means which also provide barrier seals. The upstream side of the boom presents a baffle surface. Adjacent the baffle surface a series of paddle means skim the water and collect the debris. At one end of the boom the paddle means traverse a ramp. The coaction of paddle means against the ramp moves skimmed liquids and collected debris to a sump.

1 Claim, 5 Drawing Figures

PATENTED SEP 10 1974  3,834,538

FLOATING ANTI-POLLUTION APPARATUS

BACKGROUND OF THE INVENTION

The invention relates to floating apparatus to be anchored across a polluted stream for collection and removal of water-floating liquids and water-carried debris.

Stream pollution may be an ecological problem of recent definition but relevant apparatus is of ancient vintage. Illustrative prior art indicates that the talents of inventors in this art were concerned primarily with economics. Collecting oil from surfaces of rivers motivated John Cannon to obtain U.S. Pat. No. 42,073 March, 1864. Cannon discloses a floating boom in the form of a trough extending across, or partly across, a river or stream at an acute or oblique angle. Cannon's float board did not remove "sticks and other impurities" which were prevented from entering the oil collecting trough by a vertical screen.

U.S. Pat. No. 61,880, February, 1867, discloses the concept of a boat which first collected and then emulsified water-floating oil for better separation of "chips, dirt or other foreign matter that may float with the oil." Here again, primarily an economic rather than an ecologic motivation.

Two U.S. Pat. No. 1,397,891 and No. 1,397,892, granted November, 1921, to R. P. Jones do make specific reference to "Laws to prevent pollution of streams." In the '891 patent, a floating trap for placement around the discharge end of a "waste ditch" collected oil for pumping back to shore. The '892 patent discloses details of the floating oil-pump intake and also shows a barrier positioned shore-to-shore. A comparatively recent U.S. Pat. No. 3,438,205, April, 1969, discloses a floating trough-like water skimmer for removal of "sludge and pollutants" in a manner somewhat analogous to the oil-collecting trough of the 1864 patent to Cannon.

The problems of the art to which the subject matter of the invention pertains, should be considered objectively in determining the presence of invention. A floating anti-pollution apparatus should be inexpensive to construct, should be relatively efficient in the collection and removal of water-floating liquids and water-carried debris, and should be relatively easy to maintain in operation under varied conditions of water level and weather. Indicative of an objective approach to the problems of the art, is U.S. Pat. No. 3,563,380, granted February, 1971, for a floating boom on which a person can walk to manually skim the collected contaminates.

SUMMARY OF THE INVENTION

The object of the invention is to provide an improved floating apparatus to be anchored across a polluted stream for collection and removal of water-floating liquids and water-carried debris.

It is a further object of the invention to provide a floating anti-pollution apparatus which is inexpensive to construct, relatively efficient in the collection and removal of water-floating liquids and water-carried debris, and is relatively easy to maintain in operation under varied conditions of water level and weather.

These and other objects of the invention, and the advantages thereof, will be apparent from the Description of a Preferred Embodiment below.

In general, a floating anti-pollution apparatus for anchoring across a stream to skim the water and collect the debris, comprises a buoyant boom with ends for fitting into shore abutments and an upstream side presenting a baffle surface. Associated with the boom is a series of longitudinally moving paddle means adjacent the baffle surface, and a ramp. Coaction of the paddle means and the ramp moves skimmed liquids and collected debris to a collection sump, while permitting drainage of water back to the stream.

The boom may consist of a plurality of floating wood members separated by spacers and having a predetermined length sufficient to span a stream at an oblique or acute angle and for insertion within shore abutments. The anchoring means at the ends of the boom may include a vertically oriented guide permitting rise or fall of the boom during changes of water level. Each guide is adapted for engagement by the boom through a pressure device on the downstream wall of an abutment. The paddle means may be relatively rigid rubber wiper blades secured at right angles to a closed-loop conveying means. The ramp may be a box-like structure inclined upwardly and extending from a point below the water surface to a point above the sump. The bottom and side walls of the ramp are dimensioned so that the wiper blades will be frictionally engaged during movement therethrough.

DETAILED DESCRIPTION OF THE INVENTION

Figure 1:
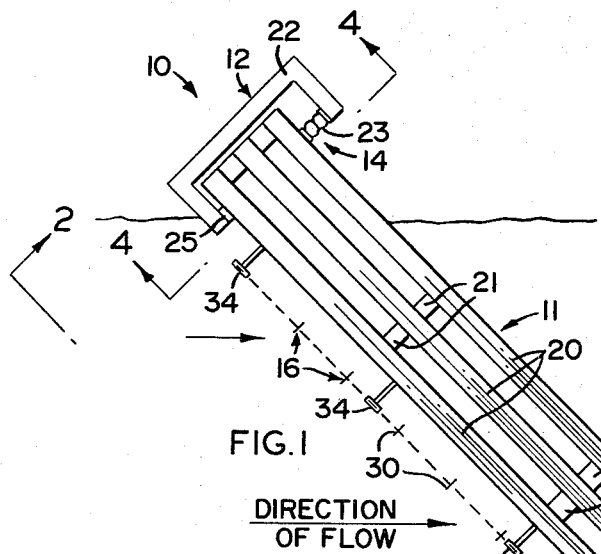
FIG. 1 is a plan view of a floating anti-pollution apparatus according to the invention, positioned across a polluted stream.
Figure 5:
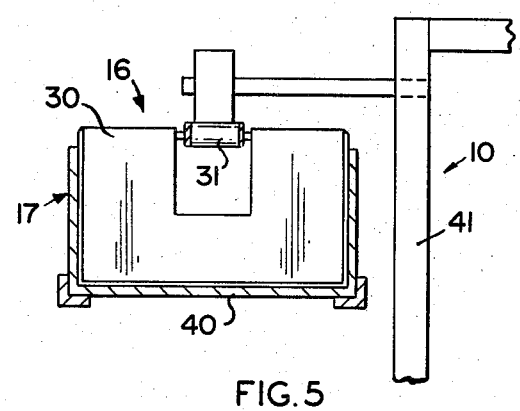
FIG. 5 is an enlarged cross sectional view showing the ramp, a paddle means and a conveying means therefor, and support structure.
Figure 3:
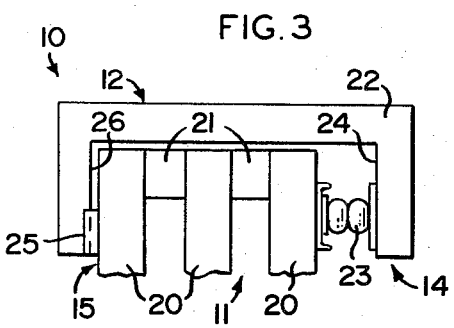
FIG. 3 is a plan view of a boom end and a shore abutment.
Figure 4:
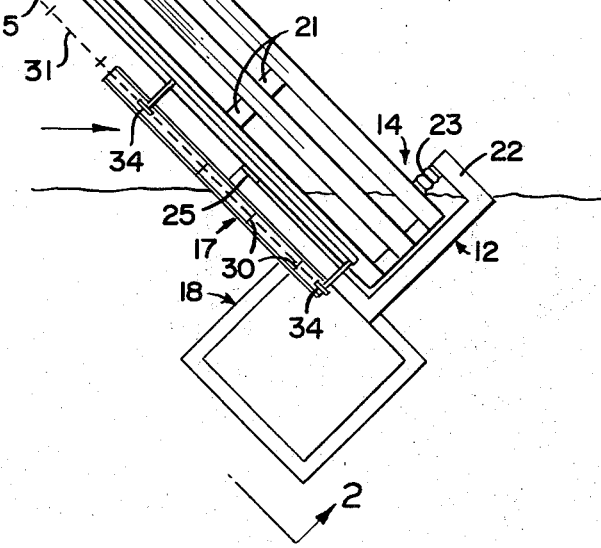
FIG. 4 is a cross-section taken substantially as indicated on 4—4 of FIG. 1.
Figure 4:
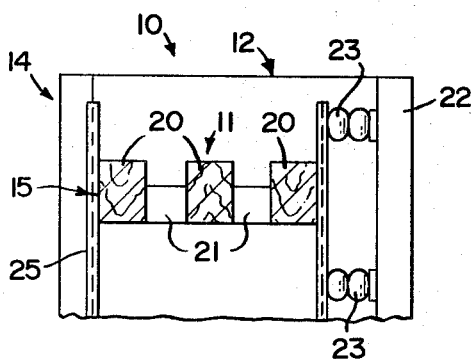
Figure 4:
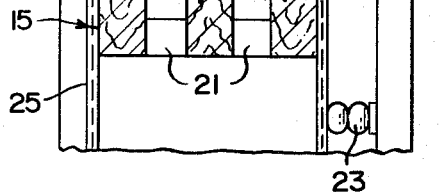
Figure 2:
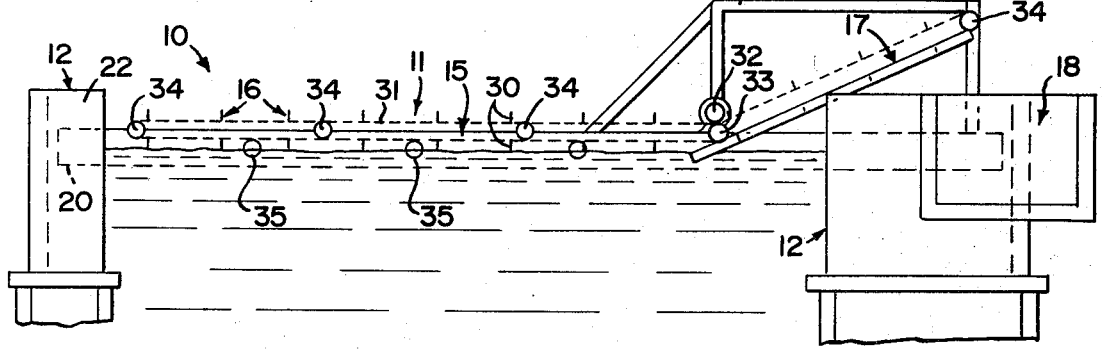
FIG. 2 is a side elevation of apparatus according to the invention, taken substantially as indicated on line 2—2 of FIG. 1.

The floating anti-pollution apparatus according to the invention, for anchoring across a stream to skim the water and collect the debris, is referred to generally by the numeral 10.

The primary longitudinal component of an apparatus 10 is a buoyant boom referred to generally by the numeral 11. The ends of the boom 11 are fitted into shore abutments referred to generally by the numeral 12. The ends of a boom 11 are anchored and sealed within the abutments 12 by a means referred to generally by the numeral 14. The upstream side of a boom 11 presents a baffle surface referred to generally by the numeral 15. Adjacent the baffle surface 15 are a series of longitudinally moving, or traversing, paddle means referred to generally by the numeral 16 to skim the water and collect debris. At one end of the boom 11, the paddle means 16 traverse a ramp referred to generally by the numeral 17. The coaction of paddle means 16 and the ramp 17 moves skimmed liquids and collected debris, to a collection sump referred to generally by the numeral 18, while permitting drainage of water.

As shown, the boom 11 may consist of three floating wood members 20, separated by spacer members 21.

The wood members 20 have a predetermined length sufficient to span the stream at an angle, and for insertion within the shore abutments 12.

The anchoring means 14 at the ends of the boom 11 include a vertically oriented channel or guide 22 permitting rise or fall of the boom during changes of water level. Each guide 22 is adapted for engagement by the boom through an adjustable pressure device 23. As shown, the pressure device 23 preferably extends horizontally from the down stream wall 24 of an abutment 12 and may comprise pairs of fluid-inflated bellows or springs. When the pressure devices are actuated, the ends of the boom 11 may be held with pre-selected force engagement with a verticaly oriented surface or seal 25. Each seal 25 is preferably on the upstream wall 26 of an abutment 12 and has a resilient or sealing surface for engagement with a boom 11.

When a boom 11 is within the abutments 12, the anchoring means 14 will permit adjustment for changes in water level but will maintain a barrier seal so that pollution in the stream will not be allowed passage around the boom ends.

The baffle surface is an upstream-facing surface, such as the outer face 15 of the upstream float member 20. The buoyancy of the boom 11 and adjustment of the anchoring means 14 is preferably such that the baffle surface 15 extends above and below the water surface sufficiently to stop the flow of water-floating liquids and to prevent the passage of water-carried debris.

The paddle means which moves the water and the debris comprise a series of elements which sequentially move from a point adjacent one abutment wall 26 transversely along the baffle surface 15 and then up the ramp 17. As shown, the paddle means 16 may be relatively rigid rubber wiper blades 30 secured at right angles to a closed loop conveying means such as a roller-chain 31. The roller-chain 31 is driven by a weather proof motor 32 from a drive pulley 33. The roller-chain 31 is guided by a series of horizontally oriented idler pulleys 34 suitably mounted on the float members 20. Additional idler pulley 35 may be provided to restrict distortion of the chain roller 31 when the wiper blades 30 are immersed in the stream during traversal of the baffle surface 15.

The ramp 17 is a box-like structure 40 inclined upwardly and extending from a point below the water surface to a point above the sump 18. The bottom and side walls of the ramp box 40 are dimensioned so that the wiper blades 30 will be frictionally engaged during movement therethrough. The relatively rigid wiper blades 30 will "squeegee" water-floating liquids, and move debris, up the ramp 17 but will permit drainage or return of relatively pollutant-free water back into the stream.

The ramp means 17 is carried by a support structure 41 extending above the float members 20 and suitably dimensioned so that an end idler pulley 34 will be in position with relation to the sump 18 to effect dumping of the liquid and debris pollutants.

What is claimed is:

1. An anti-pollution apparatus for skimming the water of a stream and collecting the debris, comprising shore abutments, a buoyant boom having a length sufficient to span the stream at an angle and ends to enter said abutments, the upstream-facing side of said boom constituting a baffle surface, a closed loop conveying means operatively supporting skimming paddles for movement in a direction parallel to said baffle surface and in cooperation with the surface of an inclined ramp, a collection sump at the end of said ramp to receive skimmed liquids and collected debris, said boom-ends constructed for vertical movement within a vertically oriented guide included in said abutments, and fluid-inflatable spring-members extending from said guide toward, and sealingly cooperating with the ends of, said boom.

* * * * *